United States Patent
Fay et al.

(10) Patent No.: US 12,064,927 B2
(45) Date of Patent: Aug. 20, 2024

(54) ESTABLISHING ELECTRONICS IN COMPOSITE PARTS BY LOCATING ELECTRONICS ON LAY-UP MANDRELS

(71) Applicant: The Boeing Company, Chicago, IL (US)

(72) Inventors: Matthew K. Fay, Wentzville, MO (US); Keith D. Humfeld, Federal Way, WA (US)

(73) Assignee: The Boeing Company, Arlington, VA (US)

( * ) Notice: Subject to any disclaimer, the term of this patent is extended or adjusted under 35 U.S.C. 154(b) by 413 days.

(21) Appl. No.: 16/184,146

(22) Filed: Nov. 8, 2018

(65) Prior Publication Data

US 2020/0147902 A1    May 14, 2020

(51) Int. Cl.
*B29C 70/30* (2006.01)
*B29C 70/54* (2006.01)
*B29L 31/30* (2006.01)

(52) U.S. Cl.
CPC .......... *B29C 70/305* (2013.01); *B29C 70/541* (2013.01); *B29L 2031/3082* (2013.01); *B29L 2031/3085* (2013.01)

(58) Field of Classification Search
CPC ... B29C 70/305; B29C 70/541; B29C 70/882; B29C 70/86; B29C 70/885; C08J 5/24
(Continued)

(56) References Cited

U.S. PATENT DOCUMENTS 4,717,271 A * 1/1988 Bauer .................. B41J 1/243
                                                            400/144.2
4,717,291 A    1/1988 Zafir
(Continued)

FOREIGN PATENT DOCUMENTS

CN    102073411 A    5/2011
CN    105083583 A    11/2015
(Continued)

OTHER PUBLICATIONS

Extended European Search Report prepared by the European Patent Office in application No. EP 19 20 5266.0 dated Mar. 20, 2020.

(Continued)

*Primary Examiner* — Michael A Tolin
*Assistant Examiner* — Hana C Page
(74) *Attorney, Agent, or Firm* — McDonnell Boehnen Hulbert & Berghoff LLP

(57) ABSTRACT

A method for forming composite materials and associated apparatuses is presented, including positioning at least one electronic component on a lay-up surface. The method also includes positioning a composite on the lay-up surface, where the composite comprises resin and fibers. Additionally, the method includes causing a flow of the resin between the lay-up surface and the fibers. Yet further, the method includes curing the resin to form a cured resin, where the electronic component and the fibers are located in the cured resin. The composite material includes a resin having a shape based on a surface of a lay-up system. Additionally, the composite material includes fibers contained within the resin. Further, the composite materials includes at least one electronic component. The electronic component of the composite material is located in the resin based on a flow of the resin around the electronic component on the surface of the lay-up.

20 Claims, 9 Drawing Sheets

(58) Field of Classification Search
USPC .......................................................... 264/239
See application file for complete search history.

(56) References Cited

U.S. PATENT DOCUMENTS

| | | | | |
|---|---|---|---|---|
| 7,391,622 | B2* | 6/2008 | Marshall | ............. B29C 35/0272 |
| | | | | 361/795 |
| 8,745,864 | B2* | 6/2014 | Kessler | .................. G08C 19/16 |
| | | | | 29/854 |
| 9,497,858 | B2* | 11/2016 | Hofer | .................... H05K 1/0366 |
| 2010/0140448 | A1 | 6/2010 | Koerwien | |
| 2011/0222225 | A1 | 9/2011 | Kessler et al. | |
| 2013/0016019 | A1* | 1/2013 | Stoneback | ............... H01Q 1/28 |
| | | | | 343/705 |
| 2013/0269175 | A1 | 10/2013 | Handy et al. | |
| 2014/0029208 | A1* | 1/2014 | Nishimura | ............. H05K 1/181 |
| | | | | 361/728 |
| 2014/0097011 | A1 | 4/2014 | Hoffer | |
| 2015/0342077 | A1* | 11/2015 | Dalal | ........................ B64F 5/00 |
| | | | | 361/760 |
| 2016/0037633 | A1* | 2/2016 | Downs | .................... B32B 15/14 |
| | | | | 428/221 |
| 2016/0121553 | A1* | 5/2016 | Paesano | .................. B29C 70/54 |
| | | | | 264/258 |
| 2016/0343467 | A1* | 11/2016 | Wen | .......................... B64C 3/20 |
| 2017/0028628 | A1* | 2/2017 | Evans | .................... B29C 70/382 |
| 2019/0386474 | A1* | 12/2019 | Rodeghiero | ........... H05K 3/125 |

FOREIGN PATENT DOCUMENTS

| | | |
|---|---|---|
| CN | 10657699 A | 2/2017 |
| CN | 107825780 A | 3/2018 |
| EP | 3 296 092 | 3/2018 |
| EP | 3 566 939 | 11/2019 |
| JP | 2002-88175 | 3/2002 |
| JP | 2005-329694 | 12/2005 |
| JP | 2012-193374 | 10/2012 |
| WO | 2014/160498 A | 10/2014 |

OTHER PUBLICATIONS

Communication pursuant to Article 94(3) EPC prepared by the European Patent Office in application No. EP 19 20 5266.0 dated Nov. 9, 2020.
First Notification of Office Action prepared by the Chinese Patent Office in application No. 201911086416.9 issued Aug. 1, 2022.
Notice of Reasons for Rejection issued by Japanese Patent Office in Application No. JP 2019-197623 dated Oct. 10, 2023. English translation included.

* cited by examiner

ESTABLISHING ELECTRONICS IN COMPOSITE PARTS BY LOCATING ELECTRONICS ON LAY-UP MANDRELS

TECHNICAL FIELD

This disclosure generally relates to systems and processes for forming a laminate composite, particularly those having integrated electronics.

BACKGROUND

Composite laminates and structures are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft manufacturing and assembly, such composite laminates and structures are used in increasing quantities to form the fuselage, wings, tail section, skin panels, and other components.

Aerospace manufacturers increasingly use composite laminates in an effort to reduce the weight and increase the performance of some components. Composite laminates used by the aerospace industry typically comprise a fiber-reinforced composite material. Fiber-reinforced composite materials of this type generally comprise two essential components, namely firstly the fibers and secondly a resin (e.g., polymer matrix) which surrounds the fibers. The resin encompasses the fibers and, in the case of thermosetting polymer matrices, is cured and consolidated by a thermal treatment, such that three-dimensional cross-linking takes place. This cure and consolidation has the effect that the fibers are bonded firmly to one another and trapped air and volatiles are removed from the laminate. Similar thermal processing may occur for thermoplastic polymer matrices also resulting in consolidation of the final composite laminate. A range of suitable fiber materials may be used for high performance applications, most commonly carbon fibers but also glass or aramid fibers may be used as well.

Fabricating composite parts require the use of a lay-up tool (also known as a base tool, forming tool or mandrel) on which layers of composite materials or pre-cure lamina are hand formed or laid one ply at a time. These applications can utilize complex contoured finished parts or channels that must be formed and then cured. Typically, the pre-impregnated composite fiber plies ("pre-pregs") such as resin impregnated carbon fiber laminates are laid by hand or by a machine over a tool or mandrel. Once the desired numbers of layers are placed on the tool, the composite laminate is bagged and cured in a curing apparatus, such as an autoclave.

SUMMARY

The disclosed examples provide a method for forming composite materials having embedded electronic components. The method includes positioning at least one electronic component on a lay-up surface of a lay-up system. The method also includes positioning a composite material on the lay-up surface, where the composite comprises resin and fibers. Additionally, the method includes causing a flow of the resin between the lay-up surface and the fibers. Yet further, the method includes curing the resin to form a cured resin, where the cured resin supports both the electronic component and the fibers to form a composite piece with integrated electronics.

In some examples, positioning the at least one electronic component includes depositing electronically conductive ink on the lay-up surface. In some examples, the method includes depositing a non-conductive layer on top of at least a portion of the electronically conductive ink and depositing a second layer of conductive ink on top of the non-conductive layer. Examples of the method can also include placing a protective layer on the lay-up surface. The method can also include positioning a plurality of electronic components on a top surface of the protective layer. A top surface of the resin includes a surface of the electronic component and the method can also include determining a measure of flatness of the top surface is within a predefined flatness tolerance.

Another disclosed example includes a composite material apparatus having electrical functionality. The composite material includes a resin having a shape based on a surface of a lay-up system. Additionally, the composite material includes fibers contained within the resin. Further, the composite materials includes at least one electronic component. The electronic component of the composite material is located in the resin based on a flow of the resin around the electronic component on the surface of the lay-up system.

In some examples, the at least one electronic component is electronically conductive ink. The apparatus can also include a non-conductive layer on top of at least a portion of the electronically conductive ink and second layer of conductive ink on top of the non-conductive layer. The top surface of the composite material includes a surface of the electronic component and a measure of flatness of the top surface may be within a predetermined flatness tolerance. The electronic component may be a set of wires, where the wires are mechanically supported by a resin of the composite material. The electronic component may be a strain sensor located in a resin of the composite material, where the strain sensor is configured to measure a flex of the composite material. The electronic component may be a light emitting diode located in a resin of the composite material, where the light emitting diode receives power from wires located in the resin.

Also disclosed is a method of forming a composite piece. The method includes depositing electronically conductive ink on a lay-up surface to form a set of wires. The method also includes positioning a composite on the lay-up surface, where the composite comprises resin and fibers. The method further includes causing a resin flow between the lay-up surface and the fibers. Additionally, the method includes curing the resin to form a cured resin, where the set of wires is held in place by the cured resin.

In some examples, depositing the wiring harness further includes depositing a non-conductive layer on top of at least a portion of the electronically conductive ink. The method can also include depositing a second layer of conductive ink on top of the non-conductive layer, where the wiring harness forms a three-dimensional structure. In some additional examples, depositing the wiring harness further includes forming a plurality of composite pieces and electronically coupling the wiring harness of a first composite piece to the wiring harness of a second composite piece. The method may also include depositing the wiring harness on top of a protective layer on the lay-up surface. The method can also include positioning an electronic component on the lay-up surface and electronically coupling the wiring harness to the electronic component.

The features, functions, and advantages that have been discussed can be achieved independently in various examples or may be combined in yet other examples, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

Figure 1A:
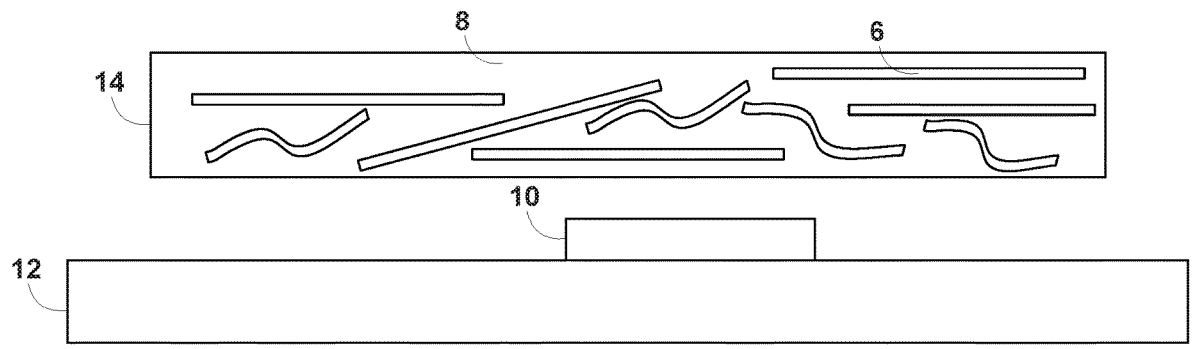
FIG. 1A is a schematic illustration of a side view of a lay-up surface, an electronic component, and a composite material before forming.

As discussed above, composite materials are seeing increased use in the manufacture of aircraft, spacecraft, rotorcraft, watercraft, automobiles, trucks, and other vehicles and structures. While there are many benefits to using composite materials, as an aircraft, for example, is constructed, it also requires electrical systems to be installed. The present disclosure offers the benefit of integrating electronic components into the construction of various different composite structures. By integrating electronic components into the composite pieces, several benefits are achieved. A non-exhaustive list of benefits includes among other things, fewer steps to manufacture the aircraft, electronic components become protected by the composite piece, the cost and weight of the electronic components may be reduced, the placement of components may be more accurate, and the electronic components may be more mechanically robust.

By integrating electronics into the composite structures, the amount of labor needed to complete the electrical system during the assembly of an aircraft may be significantly reduced. In one example, a composite piece may have an integrated electronic component that is an integrated in a set of wires, such as a wiring harness. As the aircraft is assembled, the need to run a separate wiring harness may be reduced. Thus, there are fewer steps in the final aircraft assembly.

In another example, composite materials may have sensors or electronics embedded within them. A composite that forms an aircraft wing, for example, may include an embedded stress sensor that is configured to measure the stress on the aircraft wing during flight. As another example, a composite that forms part of a fluid tank may have integrated sensors that measure the fluid level in the tank. In yet another example, a composite used on the inside of the aircraft may have integrated light emitting diodes (LEDs) that provide light in the aircraft.

When components are conventionally placed on an aircraft, they may be susceptible to being bumped, hit, or unintentionally contacted in other ways, in the present disclosure, when a composite piece is formed electronics are integrated into the resin that forms the surface of the composite piece. Additionally, because the electronic components of the present disclosure are integrated within the composite piece, the electronic component may be protected by the composite piece itself. Therefore, the resin can protect the electronic component from unintentional or undesirable contact.

Yet further, the present disclosure can reduce the cost and weight of various electronic components. Generally, when an aircraft is built, the electronic components are selected based in part on their mechanical characteristics. For example, in conventional aircraft assembly, the gauge (i.e., diameter) of wires may be selected based on their mechanical properties to avoid breakage because wires that have sufficient electrical properties may be too thin to be mechanically robust. Because components are selected based on mechanical properties, they may be larger and heavier than what the component would have to be if only, electrical considerations are needed. In the present disclosure; the resin of the composite piece provides mechanical stability and rigidity to the electronic components. Because of the stability and rigidity provided by the resin, the components embedded in the composite piece can have the desired mechanical properties. Therefore, the electronic components used can be ones that are smaller than conventional aircraft because the mechanical properties are provided by the resin of the composite material.

A suitable forming or lay-up tool having a shape complementary to the shape of the desired part may be used. Existing forming tools can be used or in some circumstances a forming tool is fabricated to represent the tooled surface of the desired part, for example an airplane wing stringer or other primary or secondary structures; namely, Z-shaped beams, I-beams, hat-stiffeners, C-channels, J-stiffeners, blade-stiffeners, floor-beams, ribs, frames, or spars. Fabrication and/or construction of forming tools are known to those skilled in the art and therefore such details need not be repeated here.

To form parts out of composite materials, a composite material is placed over a lay-up surface of a lay-up (i.e., forming) tool. It will be appreciated that the composite material can be any suitable material for forming composite parts, including, without limitation, dry fabric or pre-preg plies. In some examples, the lay-up surface rests upon or is linked to a vacuum base of the lay-up system. The vacuum base, tool, and composite material can be covered by a vacuum bag or membrane.

The composite material is a pre-preg or pre-impregnated composite of fibers, where an epoxy material, such as resin, is already present. The fibers often take the form of a weave and the resin is used to bond them together and to other components during manufacture. The resin is only partially cured to allow easy handling. This is known as a B-Stage material and requires cold storage to prevent complete curing. B-Stage pre-preg is always stored in cooled areas since heat accelerates complete polymerization of the resin. Composite structures or uncured lamina built of multiple plies of pre-pregs will typically require an oven or autoclave to cure the composite structure.

Heating and/or warming of the composite material can occur prior to the forming of the composite material onto the forming tool. Heating/warming of the composite material allows it to be more easily conformable to the forming tool as opposed to a composite material at ambient or room temperature. Heating can be accomplished using infrared lamps, conventional light bulbs, or any other known heating techniques. Heating of the composite can continue during the forming process. Depending on the composition of the composite material, the temperature of the composite material can be raised to about less than or equal to 200° F. The temperature of the composite material can be measure in any conventional manner, such as, with attached thermocouples.

During forming of the composite material over the forming tool, the composite material can be heated to cause a resin of the composite material to flow and air is evacuated from beneath the vacuum bag causing the membrane of the vacuum bag to be drawn down and conform to the tool. In some other examples, a resin can be applied to a fiber-based material where the resin flows over and through the fiber-based material to form the composite material before the vacuum bag is applied. This causes a first portion of the composite material to be forced down against the lay-up surface. Once the composite material has fully conformed to the forming tool, the heating of the composite material is stopped and the composite is allowed to cool.

The now formed composite material can be removed from the forming tool and placed on a curing tool. Of course, in some situations it may be advantageous to lay-up the composite material directly on a curing tool. In the event transfer to a curing tool is needed, the release films used in the lay-up procedure remain with the formed composite material. The release film is typically needed during vacuum bagging curing in an autoclave. Removal of the formed composite material can be achieved manually or alternatively, removal can be accomplished in an automated manner with mechanical assistance or with other known manufacturing methods that utilize hands-free methods, such as by use of robotic manipulators. Once on the curing tool the formed composite material can be vacuum bagged, a vacuum drawn, and placed in a curing apparatus, for example, an autoclave. In some cases the formed composite material will remain on the forming tool and sent directly to the curing apparatus.

By way of example, FIG. 1A through FIG. 7 show various examples of electronic components integrated within a composite material. While the Figures may be shown as different examples, the various different examples may be combined together to form various different structures based on the present disclosure. For example, FIGS. 2A and 2B show a set of wires that may form a wiring harness within a composite material and FIGS. 6A and 6B show an electronic component coupled to a wire within a composite material. The present disclosure also include the combination of features of these two examples (i.e., a wiring harness with at least one electronic component coupled to one of the wires). Based on the present disclosure, one skilled in the art would appreciate the various combinations of disclosed features. Further, FIG. 1A through FIG. 7 may be used with the previously-described method of forming composites and illustrate one example step in the formation.

FIG. 1A is a schematic illustration of a side view of a lay-up surface 12, an electronic component 10, and a composite material 14 before forming. As described previously, the composite material 14 may include both fibers 6 and resin 8. The fibers 6 and resin 8 of the composite material 14 is shown in FIG. 1A and not repeated throughout the figures for brevity. The resin 8 may be pliable able to flow. When the resin 8 flows, it can conform the composite material 14 to the shape of the lay-up surface 12. The fibers 6 are located within the resin 8. When the resin 8 is cured (i.e., hardened), it secures the fibers 6 in a given location. The combination of resin 8 and fibers 6 of the composite material 14 give the composite material 14 its strength.

The lay-up surface 12 can have a shape that corresponds to the compliment of the desired shape of the formed composite part. Before the composite material 14 is placed on the lay-up surface 12, an electronic component 10 can be placed on the lay-up surface 12. The electronic component 10 can be deposited on the lay-up surface 12 to position the electronic component 10 in a desired position for forming in the composite material 14. In some examples, the electronic component 10 can be deposited on the lay-up surface 12 by a printer to enable the precise location of the electronic component 10 on the layup surface 12. A printer can print conductive ink on the lay-up surface 12. The printer can be configured to print wires or other electrical circuitry. The conductive ink can form a wire that is the electronic component 10. In some other examples, an electronic component 10 can be placed on the lay-up surface 12. In various different examples, different electronic components may be used for the electronic component 10. For example, the electronic component 10 can be a light emitting diode (LED). In other examples, the electronic component 10 can be a strain sensor, a liquid sensor, or other type of sensor.

Figure 1B:
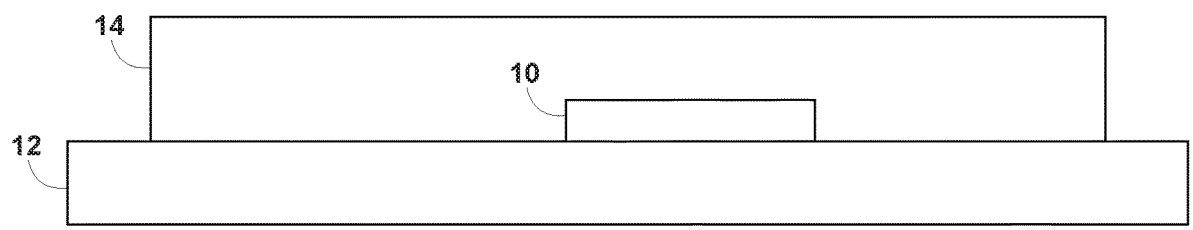
FIG. 1B is a schematic illustration of a side view of a lay-up surface, an electronic component, and a composite material after resin flow.

FIG. 1B is a schematic illustration of a side view of a lay-up surface 12, an electronic component 10, and a composite material 14 after resin 8 flow. When the resin 8 flows, it forms the shape of the lay-up surface 12. Because of the placement of the electronic component 10, the electronic component 10 can be integrated into the resin 8 when it flows on the lay-up surface 12. Thus, a top surface of the formed composite material 14 part can have the electronic component 10 integrated in the top surface such that the electronic component 10 is substantially flush with the surface of the composite material when cured. The composite material 14 provides structural support for the electronic component 10, enabling electric components to be integrated within the composite material 14 that otherwise may not be mechanically robust without the added support. Because the electronic component 10 is integrated within the resin 8 of the composite material 14, the electronic component 10 may need no other mechanical support as the composite material 14 may provide the support needed for the electronic component 10.

As previously discussed, in traditional aircraft design, many electronic components are designed for both robust electrical and mechanical performance. For example, wires or other electronic components may be designed to ensure mechanical robustness to endure installation and/or operation of the aircraft. A wire may be designed with a mechanical rigidity in mind. This mechanical rigidity can cause a wire to be heavier and thicker than electrically necessary, adding cost and weight to aircraft assembly. By locating the wire in the composite material 14, the wire may be made lighter, as the resin 8 of the composite material provides mechanical support to the wire. Similarly, other electronic components, such as sensors, may traditionally be designed with a mechanical robustness in mind. Traditionally-placed sensors may be hit or scraped, or otherwise impacted. By locating the sensor (or other electronic component) within the resin 8 of the composite material 14, the sensor may be protected from impact and not require additional protection.

Figure 1C:
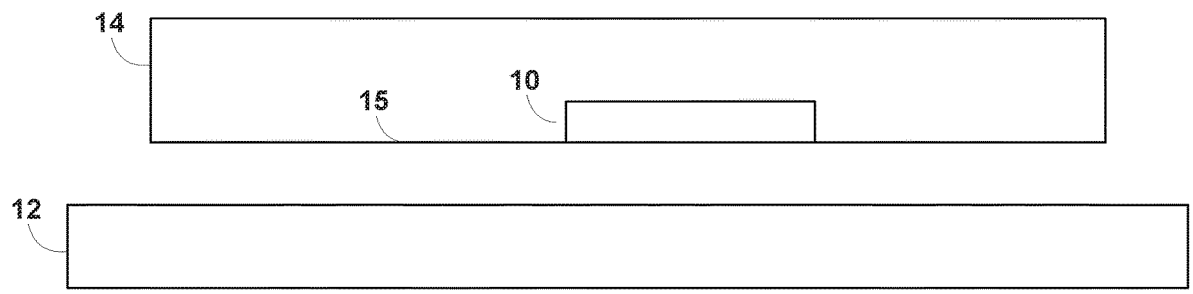
FIG. 1C is a schematic illustration of a side view of a lay-up surface, an electronic component, and a composite material after the formed composite material is separated from the lay-up surface.

FIG. 1C is a schematic illustration of a side view of a side view of a lay-up surface 12, an electronic component 10, and a composite material 14 after the formed composite material is separated from the lay-up surface. After the composite material 14 is formed, it may be removed from the lay-up surface 12. When the composite material 14 is removed, the electronic component 10 is formed within a surface of the composite material 14. Thus, a composite material 14 piece is formed that has an integrated electronic component 10.

Because the electronic component 10 has been placed directly on the lay-up surface 12, when the composite material is formed, the electronic component 10 forms a portion of a surface 15 of the composite material 14. When a composite material 14 is created the surface 15 of the composite material 14 may have a predetermined flatness criteria.

The flatness can be measured based on the standard, ASTM A1030/A1030M-16 "Standard Practice for Measuring Flatness Characteristics of Steel Sheet Products." Other standards may be used to define flatness measures as well. The flatness of the surface may be measured by mechanical means, such as by a probe, by a laser, by an optical system, or through other means. The flatness criteria can be a measure of how flat the surface 15 of the composite material is across the entire piece. The flatness criteria may be based on geometric dimensioning. For example, a flatness standard within plus or minus 0.030 inches of the flat engineering speciation can be used as the flatness criteria. A different flatness standard can be used as well. When the electronic component 10 forms a surface 15 of the composite material 14, it may be desirable for the surface 15, including the electrical component, to be within the predetermined flatness criteria. Because the electronic component 10 is within the predetermined flatness criteria, the electronic component 10 can be protected from abrasion and impact by the resin 8 of composite material 14. The flatness criteria can be similarly applied and applicable to any of the examples presented herein.

Figure 2A:
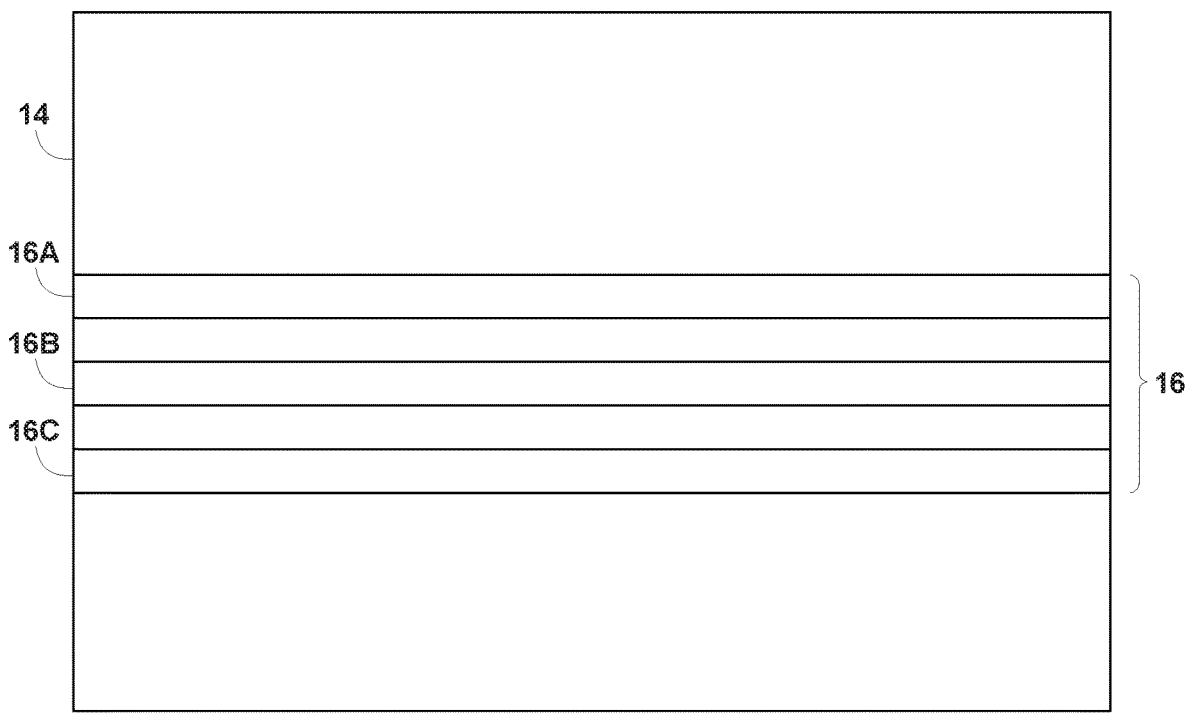
FIG. 2A is a schematic illustration of a top view of a wiring harness formed in a composite material.

FIG. 2A is a schematic illustration of a top view of a set of wires that form a wiring harness 16 comprising three wires 16A-16C formed in a composite material 14. Although FIG. 2A shows a three-wire wiring harness, more or fewer wires may be used in other possible configures. In some examples, a plurality of wires, such as three wires 16A-16C, can be formed on the lay-up surface 12, before being formed into composite material 14. The plurality of wires, such as three wires 16A-16C, can form a wiring harness 16. The wiring harness 16 can be integrated into the composite material 14 so that during the construction of an aircraft a separate wiring harness does not have to be run. Additionally, as previously discussed, the resin 8 of the composite material 14 can provide mechanical support to the plurality of wires, such as three wires 16A-16C, that form the wiring harness 16. Therefore, the wiring harness 16 may be more lightweight than traditional wiring harnesses. Further, the wiring harness 16 may only need to have two wires. An additional wire may be included for redundancy. The extra wire may be used in place of the first wire of the wiring harness 16.

Figure 2B:
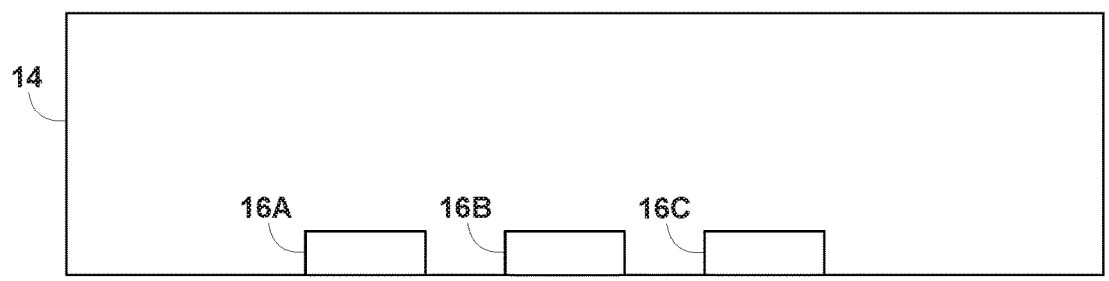
FIG. 2B is a schematic illustration of a side view of a wiring harness formed in a composite material.

FIG. 2B is a schematic illustration of a side view of a wiring harness 16 comprising a set of three wires 16A-16C formed in a composite material 14. To form the wiring harness 16, the three wires 16A-16C can be deposited on the lay-up surface 12. As previously discussed, the depositing on the lay-up surface 12 can be performed by a printer capable of printing electronically conductive ink. When the resin 8 of the composite material flows on the lay-up surface 12, the three wires 16A-16C can be integrated into the resin 8 and form a top surface of the composite material 14.

Figure 3A:
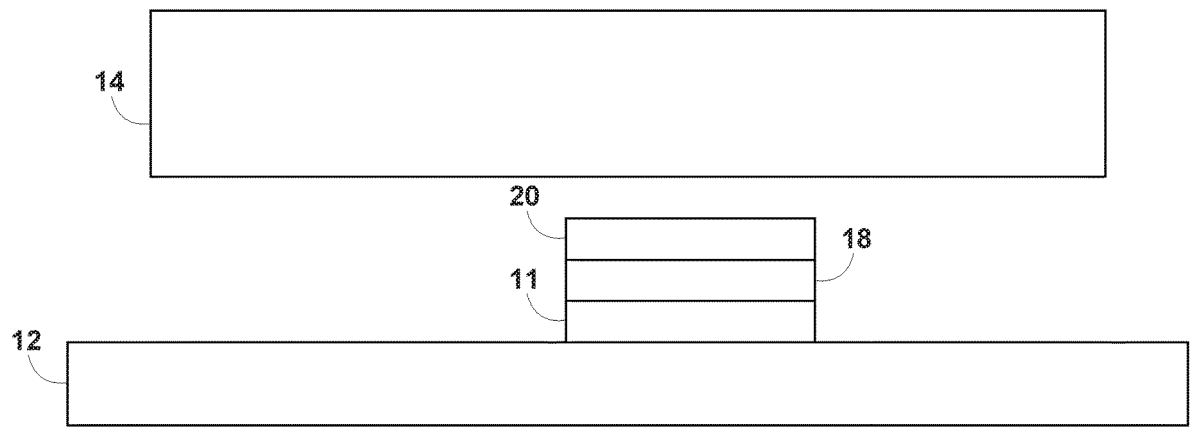
FIG. 3A is a schematic illustration of a side view of a lay-up surface, two wires, a non-conductive layer, and a composite material before forming.

FIG. 3A is a schematic illustration of a side view of a lay-up surface 12, two wires, including a first wire 11 and a second wire 20, a non-conductive layer 18, and a composite material 14 before forming. Multiple layers may be created on the lay-up surface 12 before the composite material 14 is formed. A first wire 11 may be formed on the lay-up surface 12. The first wire 11 may be placed, printed, or formed by other means on the lay-up surface. A non-conductive layer 18 can be placed, printed, or formed by other means on top of the first wire 11. The non-conductive layer 18 can be made of an insulating material. The insulating material may be of sufficient thickness to prevent signals from coupling between the first wire 11 and the second wire 20. The second wire 20 can be formed on top of the non-conducting layer. Thus, in the example shown in FIG. 3A, two wires, a first wire 11 and a second wire 20 can be formed with a non-conducting layer between them. The wires may run the extent of the composite material 14.

Figure 3B:
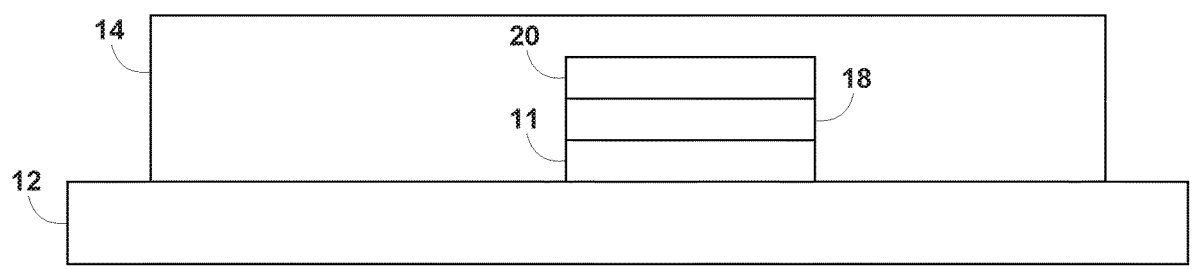
FIG. 3B is a schematic illustration of a side view of a lay-up surface, two wires, a non-conductive layer, and a composite material after resin flow.

FIG. 3B is a schematic illustration of a side view of a lay-up surface 12, two wires, including a first wire 11 and a second wire 20, a non-conductive layer 18, and a composite material 14 after resin flow. When the resin 8 flows, it can form the shape of the lay-up surface 12. The first wire 11, the second wire 20, and the non-conductive layer 18 can be integrated into the resin 8 when it flows on the lay-up surface 12. Thus, a top surface of the formed composite material 14 part may have the first wire 11 integrated in the top surface. The composite material 14 can provide structural support for the first wire 11, the second wire 20, and the non-conductive layer 18. Because the first wire 11, the second wire 20, and the non-conductive layer 18 are integrated within the resin 8 of the composite material 14, the first wire 11, the second wire 20, and the non-conductive layer 18 may need no other mechanical support as the composite material 14 can provide the support needed for the first wire 11, the second wire 20, and the non-conductive layer 18.

Figure 3C:
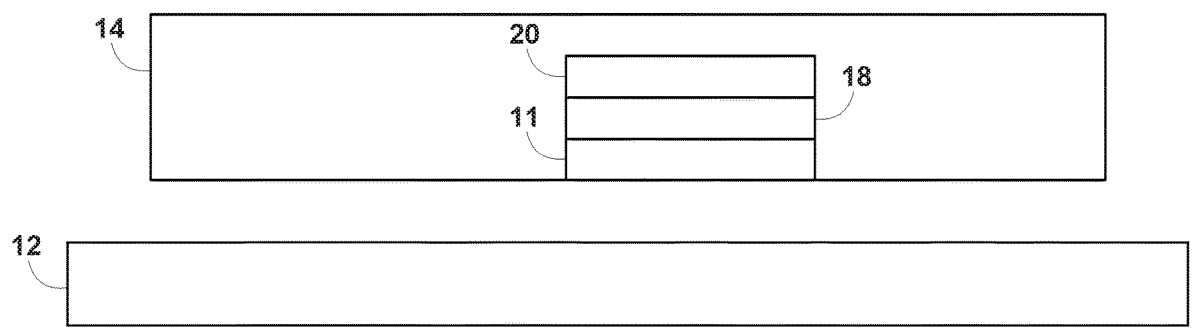
FIG. 3C is a schematic illustration of a side view of a lay-up surface, two wires, a non-conductive layer, and a composite material after the formed composite material is separated from the lay-up surface.

FIG. 3C is a schematic illustration of a side view of a lay-up surface 12, two wires, including a first wire 11 and a second wire 20, a non-conductive layer 18, and a composite material 14 after the formed composite material is separated from the lay-up surface. After the composite material 14 is formed, it may be removed from the lay-up surface 12. When the composite material 14 is removed, the first wire 11, the second wire 20, and the non-conductive layer 18 can be formed within the composite material 14 and the first wire 11 can form a surface of the composite material 14. Thus, a composite material 14 piece is formed that has the first wire 11, the second wire 20, and the non-conductive layer 18 integrated within the composite material 14.

Figure 4A:
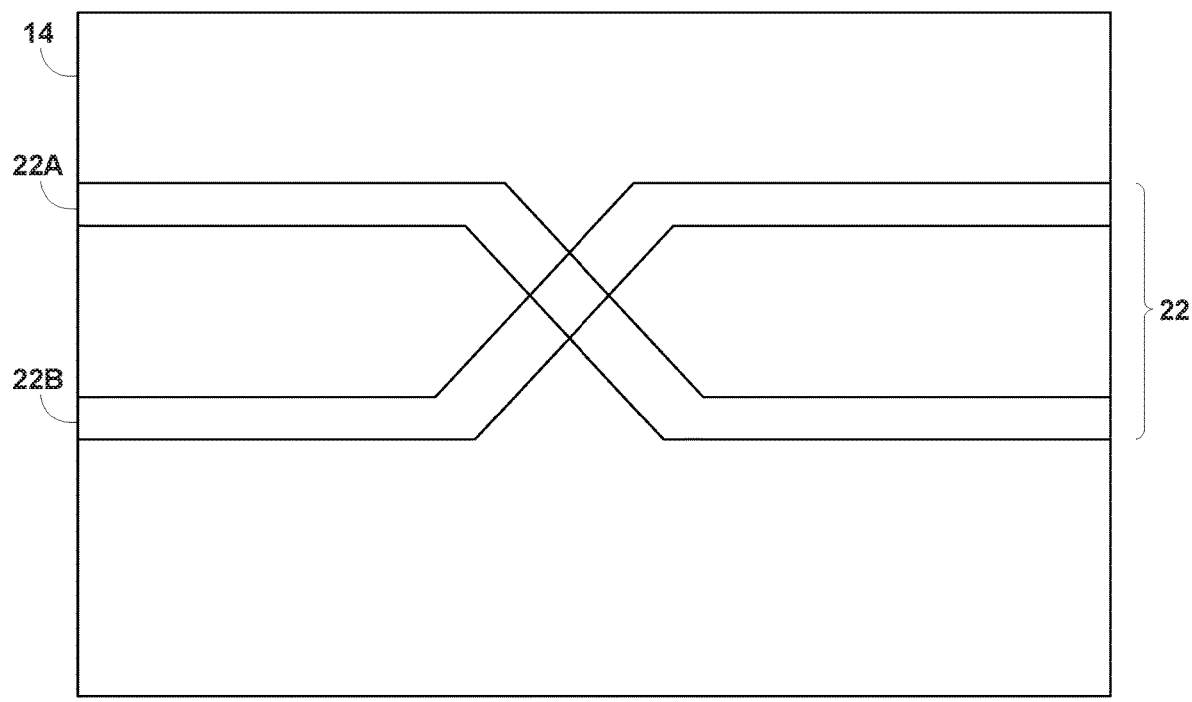
FIG. 4A is a schematic illustration of a top view of a three-dimensional wiring harness formed in a composite material.
Figure 4B:
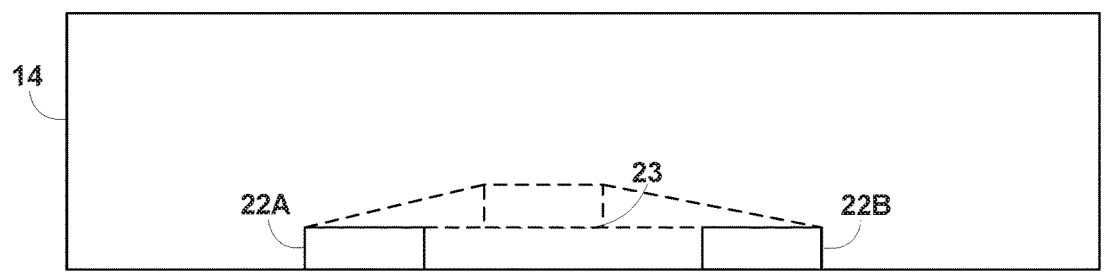
FIG. 4B is a schematic illustration of a side view of a three-dimensional wiring harness formed in a composite material.

FIG. 4A is a schematic illustration of a top view of a three-dimensional wiring harness 22 comprising two wires 22A-22B formed in a composite material 14. In some examples, various features disclosed herein may be combined. For example, as shown in FIG. 4A, a wiring harness 22 can be created that includes a three dimensional structure. In order to make the three dimensional structure, the wiring harness 22 can have a first wire 22A and a second wire 22B that cross over each other with a non-conductive layer 23 between the two. FIG. 4B is a schematic illustration of a side view of a three-dimensional wiring harness 22 comprising a first wire 22A and a second wire 22B formed in a composite material 14, where the first wire 22A and the second wire 22B have a non-conducting layer 23 separating the two. To create the wiring harness 22, a first wire 22A can be printed or placed on a lay-up surface 12. A non-conducting layer 23 can be printed or placed over a portion of the first wire 22A. The second wire 22B can be printed or placed so that is crosses over the first wire 22A at a position where the first wire 22A is covered by the non-conductive layer 23.

Figure 5A:
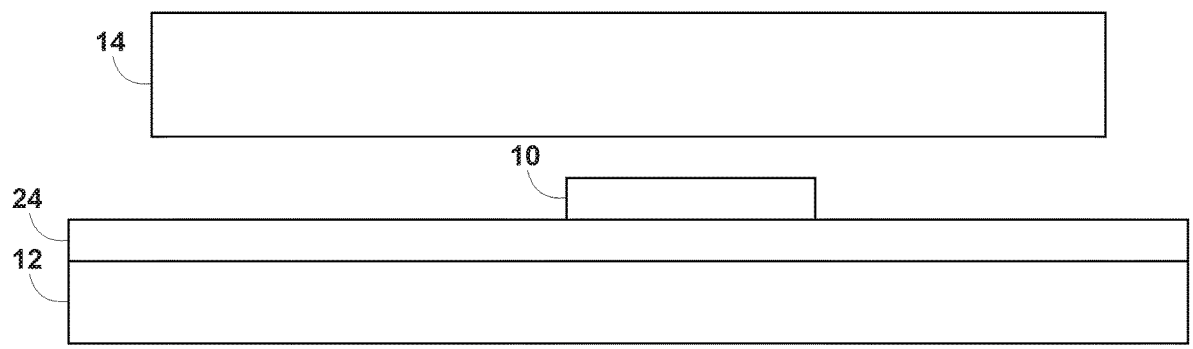
FIG. 5A is a schematic illustration of a side view of a lay-up surface, an electronic component, a protective layer, and a composite material before forming.

FIG. 5A is a schematic illustration of a side view of a lay-up surface 12, an electronic component 10, a protective layer 24, and a composite material 14 before forming. Examples disclosed herein can be combined with any other examples presented herein, for example a protective layer 24 can be placed on the lay-up surface 12 before the electronic component 10 is placed. The protective layer 24 can be a relatively thin layer that aids in removing the composite material 14 from the lay-up surface 12. The protective layer 24 can be thin enough that a formed composite material 14 takes the correct shape of the lay-up surface 12 even when the protective layer covers the lay-up surface 12.

The protective layer 24 used in the lay-up system of this disclosure can be formed of a composition that is acceptable to be used in contact with uncured composite materials and provides one or more non-sticky or low tack surfaces. For example, protective layers are preferably composed of fluorinated ethylene-propylene (FEP) and selected so as not to adversely affect, through chemical degradation, the resin content and/or resin-to-fiber ratio of the composite material used in the lay-up method. Other types of protective layers can be used, including, but not limited to, polytetrafluoroethylene (PTFE), ethylene tetrafluoroethylene (ETFE), Polyvinyl Fluoride (PVF) and TOOLTEC® (reinforced PTFE coated fiberglass with adhesive). In some examples, the protective layer 24 can have a thickness in the range of from about 0.002 to about 0.005 inches.

Figure 5B:
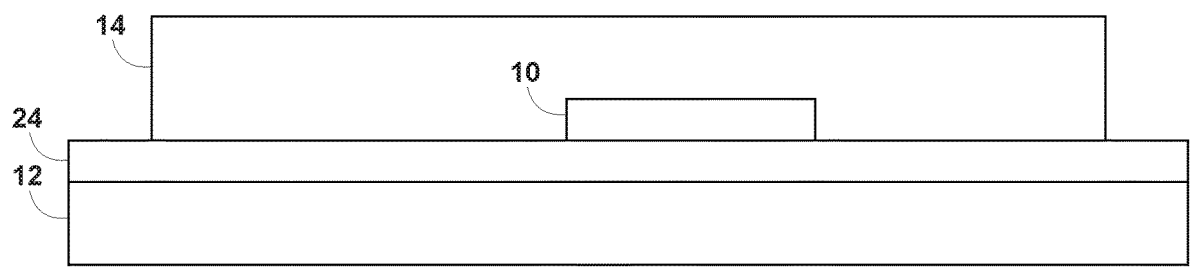
FIG. 5B is a schematic illustration of a side view of a lay-up surface, an electronic component, a protective layer, and a composite material after resin flow.

FIG. 5B is a schematic illustration of a side view of a lay-up surface 12, an electronic component 10, a protective layer 24, and a composite material 14 after resin 8 flow. When the resin 8 flows, it can form the shape of the protective layer 24 on top of the lay-up surface 12.

Figure 5C:
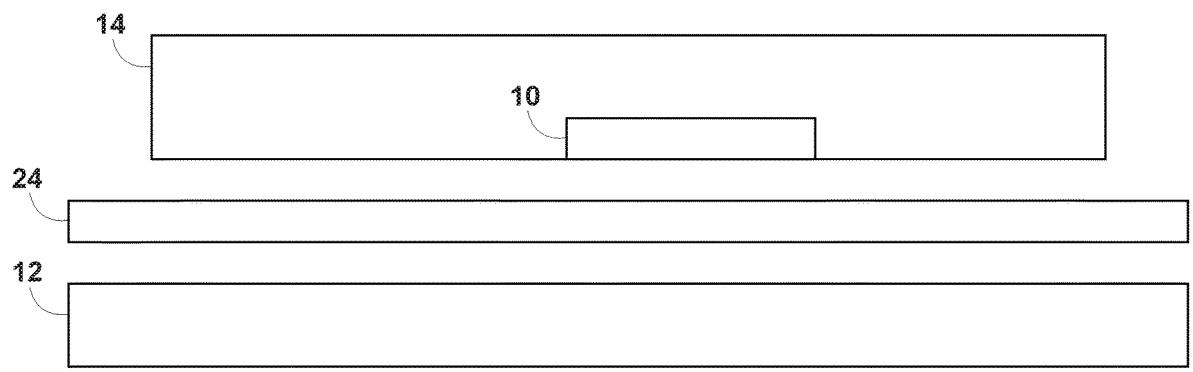
FIG. 5C is a schematic illustration of a side view of a lay-up surface, an electronic component, a protective layer, and a composite material after the formed composite material is separated from the lay-up surface.

FIG. 5C is a schematic illustration of a side view of a lay-up surface 12, an electronic component 10, a protective layer 24, and a composite material 14 after the formed composite material is separated from the lay-up surface. The formed composite material, with integrated electronic component 10 can be removed from the protective layer 24. The protective layer 24 may also be removed from the lay-up surface 12.

Figure 6A:
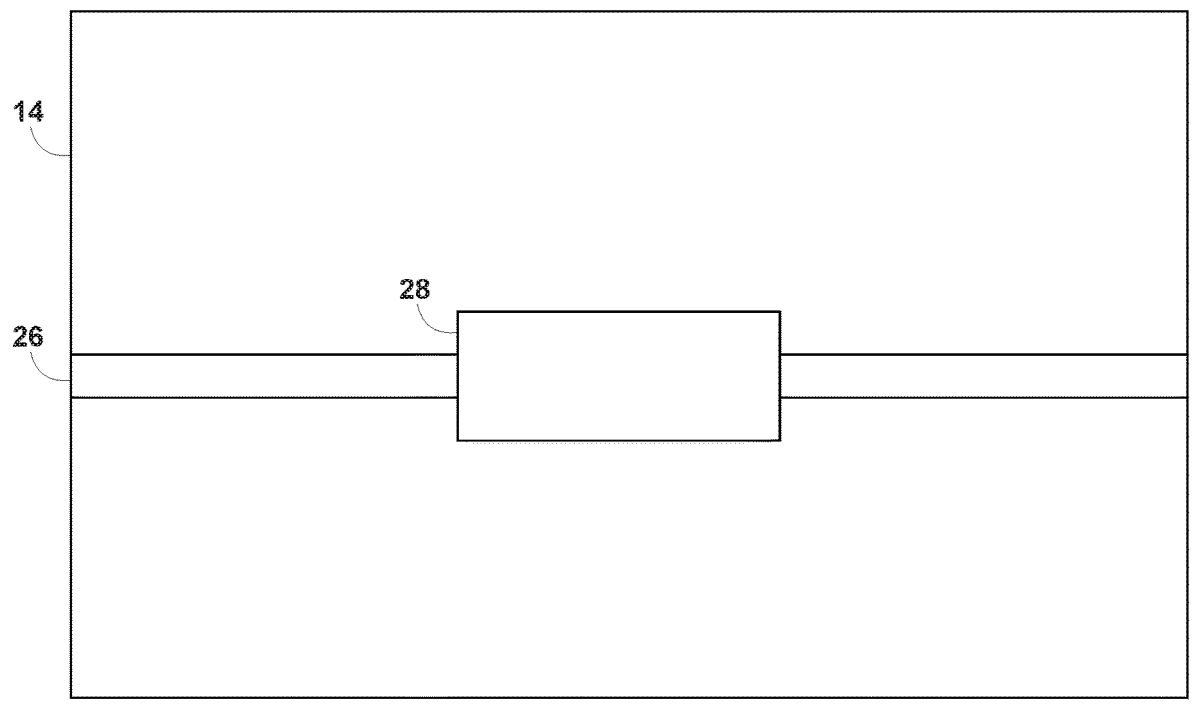
FIG. 6A is a schematic illustration of a top view of an electronic component coupled to a wire formed in a composite material.

FIG. 6A is a schematic illustration of a top view of an electronic component 28 coupled to a wire 26 formed in a composite material 14. In some further examples, an electronic component 28 may be placed or printed on a lay-up surface 12. The electronic component 28 can also be coupled to a wire 26 that is printed or placed on the lay-up surface. After forming the composite material 14 the electronic component 28 and the wire 26 may be formed within the resin 8 of the composite material. The wire 26 can enable an electrical connection to the electronic component 28. Additionally, the wire 26 may have a different layout than shown in FIG. 6A.

Figure 6B:
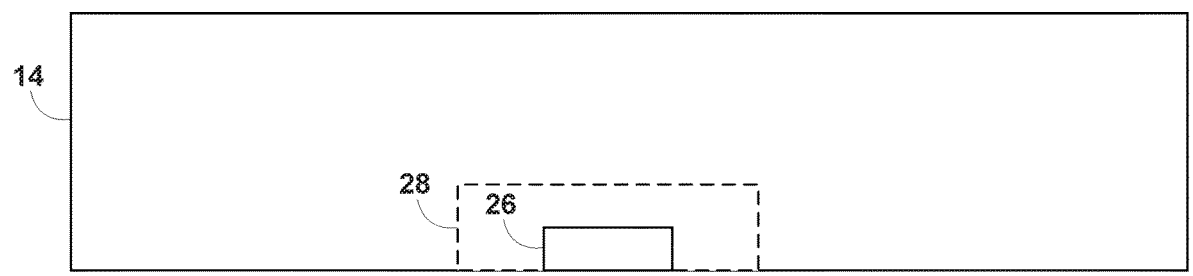
FIG. 6B is a schematic illustration of a side view of an electronic component coupled to a wire formed in a composite material.

FIG. 6B is a schematic illustration of a side view of an electronic component 28 coupled to a wire 26 formed in a composite material 14. The electronic component 28 may be formed toward the center of the surface of the composite material 14. Additionally, as shown in FIG. 6B, the wire 26 can be positioned in a way to allow an electrical connection at an end of the composite material 14.

Figure 7:
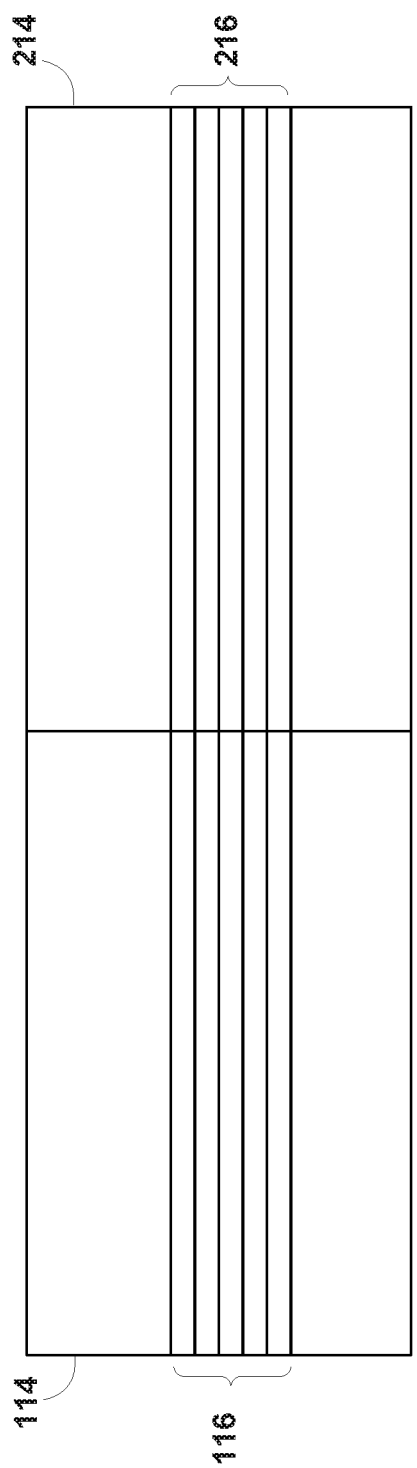
FIG. 7 is a schematic representation of two composite pieces having wiring harnesses where the two wiring harnesses are coupled to each other.

FIG. 7 is a schematic representation of two composite pieces, a first composite piece 114 and a second composite piece 214, each having a wiring harness, a first wiring harness 116 and a second wiring harness 216, where the two wiring harnesses are coupled to each other. The composite pieces 114 and 214 are shown each having a wiring harness 116 and 216, respectively. The example shown in FIG. 7 may also be used with other disclosed examples as well. Both the first composite piece 114 and the second composite piece 214 can be the same kind of composite material as the previously-described composite material 14.

As shown in FIG. 7, the first composite piece 114 can include a wiring harness 116 that is electrically coupled to the wiring harness 216 of the composite piece 214. By forming the wiring harness in the composite pieces, when an aircraft is assembled, the wiring harnesses of adjacent composite pieces may be coupled to one another. By coupling the wiring harnesses together, electrical signals can be communicated across several composite parts.

During the construction of an aircraft, it may be desirable for a wiring harness to communicate signals across many different composite panels. For example, an aircraft may have wires that communicate signals through the fuselage of a plane. By integrating wiring harnesses in the composite pieces, the placement of the wiring harness will be in the correct position when the composite parts are placed together. For example, an integrated wiring harness may simplify power routing through an aircraft's structure as the wiring may be integrated within the composite parts. By integrating wiring into parts, conventional wiring does not have to be routed around other installed features during an aircraft's construction, simplifying the construction of the electrical system. Thus, after the composite parts are coupled together, there is not a need for a wiring harness to be installed in the aircraft. Additionally, as previously discussed, the wiring harness as presently disclosed can enable the use of thinner and lighter wires. Therefore, an aircraft may be assembled that has fewer steps to construct and also is lighter in weight. Further, because the wires are integrated within the resin 8 of the composite pieces 114 and 224, the wires can be more protected that traditional exposed wiring.

Figure 8:
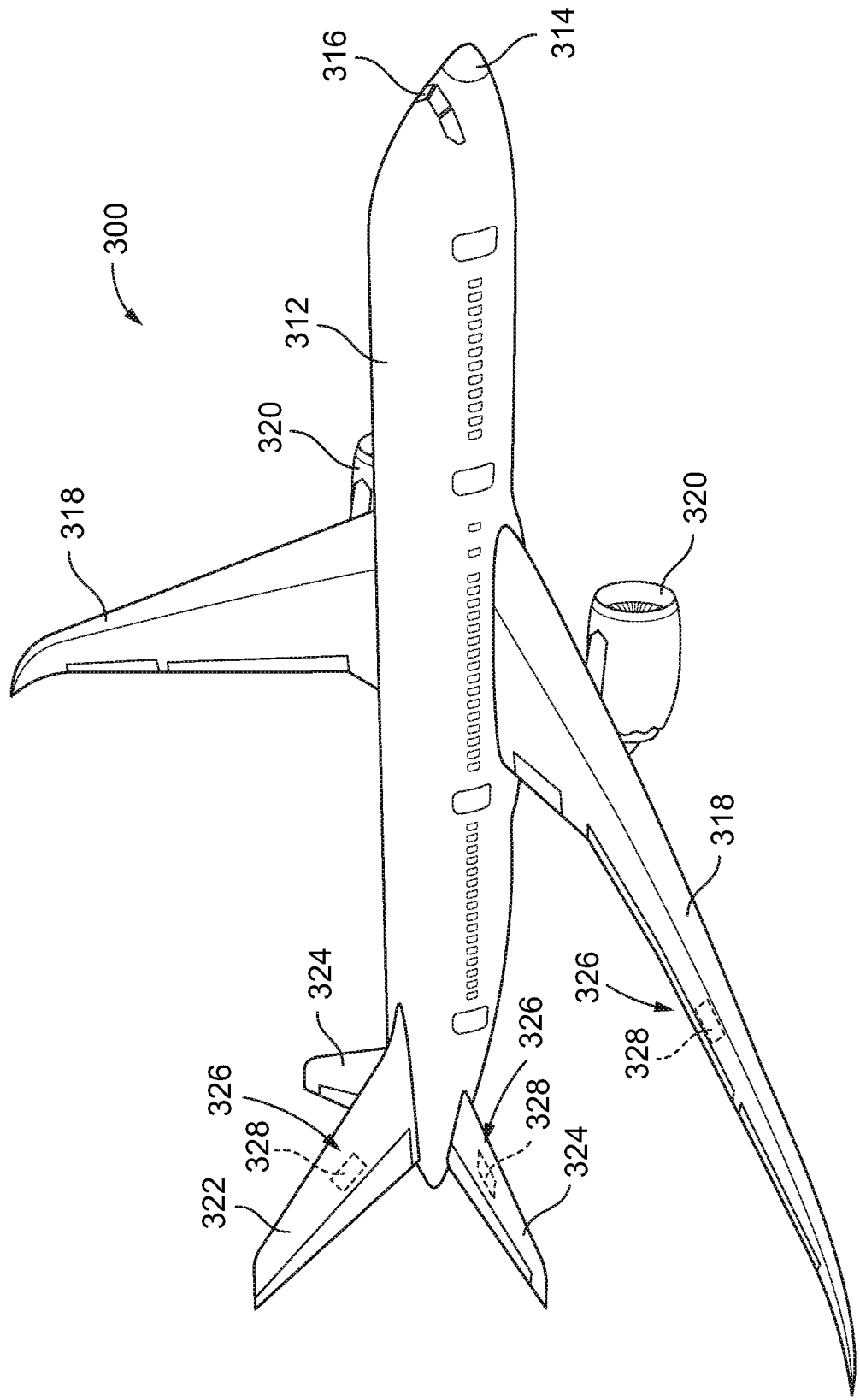
FIG. 8 is an illustration of a perspective view of an aircraft that may incorporate one or more composite laminates manufactured in accordance with one or more examples disclosed herein.

FIG. 8 is an illustration of a perspective view of an aircraft that may incorporate one or more composite materials 14 manufactured in accordance with one or more embodiments disclosed herein. As shown in FIG. 8, the aircraft 300 comprises a fuselage 312, a nose 314, a cockpit 316, wings 318 operatively coupled to the fuselage 312, one or more propulsion units 320, a tail 322, stress sensors 328, and one or more tail horizontal stabilizers 324. Although the aircraft 300 shown in FIG. 8 is generally representative of a commercial passenger aircraft, the one or more composite laminates, as disclosed herein, may also be employed in other types of aircraft or air vehicles. More specifically, the teachings of the disclosed examples may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles.

The presently-disclosed composite materials may form many different parts of an aircraft. For example, the wings, fuselage, and inter paneling may be formed from composite materials. Further, the integrated electronic components may provide a variety of functionality, depending on the location of the composite piece. For example, aircraft wings may be formed with integrated wiring and strain sensors. Interior paneling may be formed with integrated wiring and LED lighting. Yet further, fuselage components may be formed that include integrated wiring harnesses. Many other possible examples of integrating electronic components into composite materials are possible as well.

Figure 9:
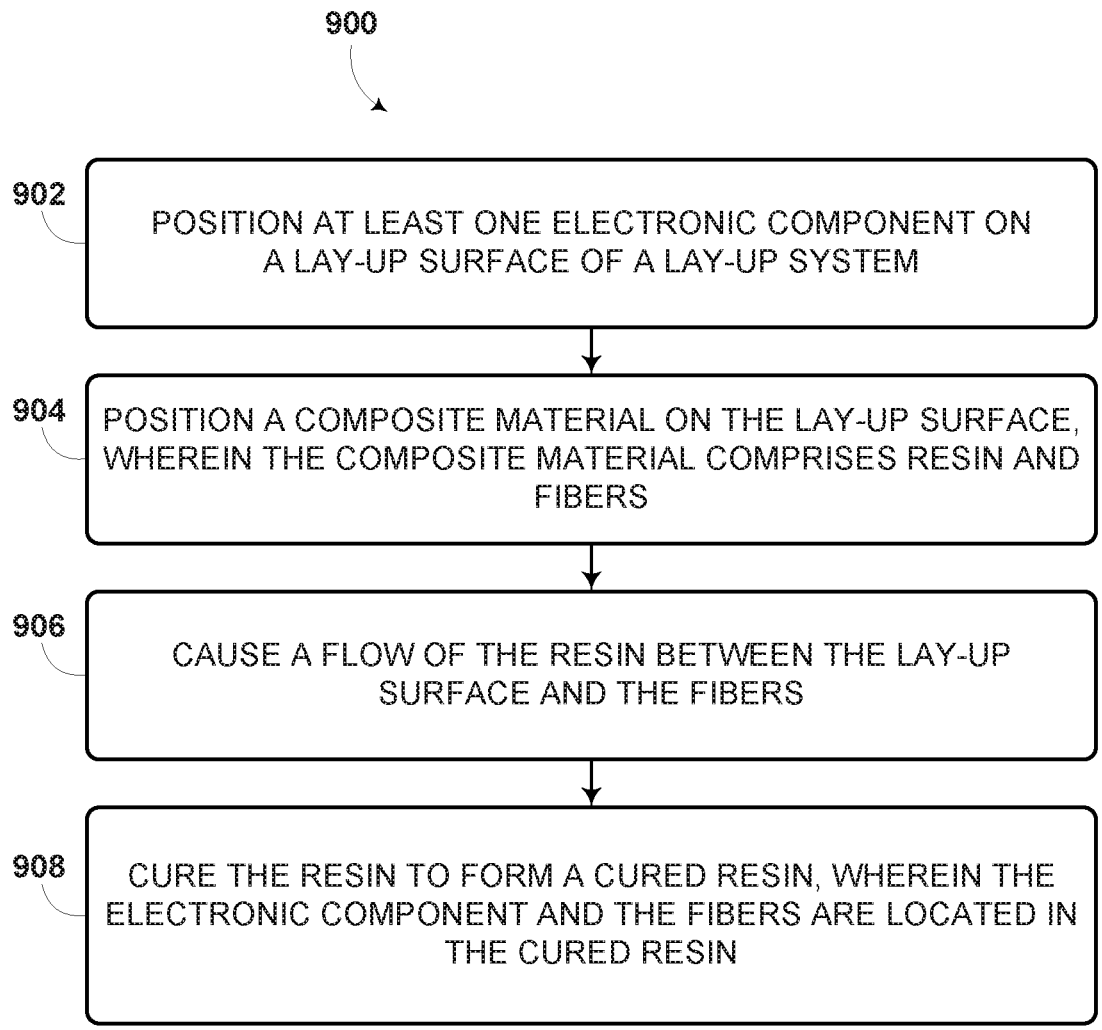
FIG. 9 is an illustration of a flow diagram of an example of a method for forming a composite part.

FIG. 9 is an illustration of a flow diagram of an example of a method for forming a composite part. At block 902, the method 900 includes positioning at least one electronic component on a lay-up surface of a lay-up system. The electronic component is placed in its desired location on the lay-up surface. In some examples, the electronic component can be printed on the lay-up surface by a printer configured to print electronically-conductive ink. A printer may be able to precisely locate the electronic component in a desired location on the lay-up surface. For example, the printer can print the location of the electronic component based on a computer aided design (CAD) layout. By printing the electronic component, the component may be located with a high degree of precision. However, in some additional examples, alternatively or in combination with printing, an electronic component can be placed by a person, by a machine, by a robot, or by other means.

In some examples, the printed conductive ink can form a wire that is the electronic component. Printing wires may enable precise placement of wires on the layup surface. In various different examples different electronic components may be used for the electronic component. For example, the electronic component may be a light emitting diode (LED). In other examples, the electronic component may be a strain sensor, a liquid sensor, or other type of sensor.

Additionally, in some examples, the printer may be configured to print a non-conductive layer on top of the electrical component to act as insulating layer so further electronic may be placed or printed on top of the electrical component without conducting electricity between them. Another electrical layer may be printed on top of the non-conducting layer. Thus, in some examples, at block 902, the electrical component can take the form of a multi-layered structure with conducting and non-conducting layers. In yet some further examples, at block 902 multiple electronic components may be placed. The multiple electronic components can form a wiring harness. The multiple electronic components may also be a sensor or LEDs that is coupled to wiring to power the electronic component.

Moreover, the positioning of the electronic component may be on a protective layer of the lay-up surface, rather than directly on the lay-up surface itself. The protective layer can enable a composite material to be more easily removed from the lay-up surface.

At block 904, the method 900 includes positioning a composite material on the lay-up surface, wherein the composite material comprises resin and fibers. As previously discussed, the composite material can be placed on the lay-up surface to take the shape of the lay-up surface. The composite material can be placed on top of the electronic component that has already been positioned on the layup surface. In various examples, the composite material may be placed in a variety of different ways, including placed by a person, by a machine, by a robot, or by other means.

At block 906, the method 900 includes causing a flow of the resin between the lay-up surface and the fibers. In some examples, after forming the composite material over the forming tool, the composite material may be heated to cause a resin of the composite material to flow over the lay-up surface. In some other examples, a resin may be applied to a fiber-based material where the resin flows over and through the fiber-based material to form the composite material. Once the composite material has fully conformed to the forming tool, the heating of the composite material is stopped and the composite is allowed to cool.

At block 908, the method 900 includes curing the resin to form a cured resin, wherein the electronic component and the fibers are located within the cured resin, causing a top surface of the electronic component to be flat with a top surface of the cured resin. Curing the resin causes the resin to harden. After the resin is hardened, a composite material piece has been formed that has the shape of the lay-up tool. Additionally, the electronic component will be formed into the resin. The resin holds the electronic component in place, provides support for the electronic component, and protects the electronic component. Additionally, the electronic component can form a portion of a top surface of the form composite material (i.e., a top surface of the resin). The composite material has a predetermined tolerance for how flat the top surface should be. The top surface, including the electronic component fall within the predetermined flatness tolerance. Because the inclusion of the electronic component does not cause the flatness of the surface to exceed the predetermined tolerances as the electronic component is placed and formed into the resin before curing, the formed composite piece may have the same shape as a similar piece without the integrated electronic component. Thus, the electronic component does not significantly alter a surface of a formed composite material.

The foregoing description of the specific examples will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed examples. It is to be understood that the phraseology or terminology herein is for the purpose of description and not of limitation.

The invention claimed is:

1. A method of forming a composite material piece comprising:
   depositing a first layer of electronically conductive ink directly on a lay-up surface to form a first wiring harness;
   depositing a non-conductive layer on top of at least a portion of the first wiring harness;
   depositing a second layer of electronically conductive ink on top of the non-conductive layer, wherein the second layer of electronically conductive ink forms a second wiring harness;
   positioning a composite material on the lay-up surface and over the second wiring harness, wherein the composite material comprises resin and fibers;
   causing a resin flow of the composite material between the lay-up surface and the fibers to form a shape of the lay-up surface and to integrate the first wiring harness, the non-conductive layer, and the second wiring harness into the resin of the composite material; and
   curing the resin to form a cured resin, wherein the first wiring harness and the second wiring harness is located in the cured resin, and wherein the cured resin is removable from the lay-up surface.

2. The method of claim 1, wherein depositing the first wiring harness further comprises:
   forming a three-dimensional structure.

3. The method of claim 1, further comprising:
   forming a plurality of composite material pieces, wherein the plurality of composite material pieces comprises the composite material piece and a second composite material piece; and
   electronically coupling the first wiring harness of the composite material piece to a wiring harness of the second composite material piece.

4. The method of claim 1, further comprising positioning an electronic component on the lay-up surface, wherein the depositing the first wiring harness further comprises electronically coupling the first wiring harness to the electronic component.

5. The method of claim 1, further comprising, removing the cured resin from the lay-up surface, and after removal of the cured resin, the first wiring harness and the second wiring harness is formed within an exterior surface of the composite material.

6. The method of claim 4, further comprising, removing the cured resin from the lay-up surface, and after removal of the cured resin, the electronic component is formed within an exterior surface of the composite material.

7. The method of claim 1, further comprising positioning a light emitting diode on the lay-up surface, wherein the depositing the first wiring harness further comprises electronically coupling the first wiring harness to the light emitting diode.

8. The method of claim 7, further comprising, removing the cured resin from the lay-up surface, and after removal of the cured resin, the light emitting diode is formed within an exterior surface of the composite material.

9. The method of claim 8, further comprising, removing the cured resin from the lay-up surface, and after removal of the cured resin, the light emitting diode is flush with a surface of the composite material.

10. The method of claim 4, further comprising, removing the cured resin from the lay-up surface, and after removal of the cured resin, the electronic component is flush with a surface of the composite material.

11. The method of claim 1, further comprising positioning a strain sensor on the lay-up surface, wherein the depositing the first wiring harness further comprises electronically coupling the first wiring harness to the strain sensor.

12. The method of claim 11, further comprising, removing the cured resin from the lay-up surface, and after removal of the cured resin, the strain sensor is formed within an exterior surface of the composite material.

13. The method of claim 11, further comprising, removing the cured resin from the lay-up surface, and after removal of the cured resin, the strain sensor is flush with a surface of the composite material.

14. The method of claim 1, wherein a top surface of the resin comprises a surface of the first wiring harness and a measure of flatness of the top surface is within a predefined flatness tolerance.

15. The method of claim 1, wherein positioning the composite material on the lay-up surface comprises positioning a pre-impregnated composite of the fibers in a weave with the resin present in a partially cured state bonding the fibers together.

16. The method of claim 1, further comprising, removing the cured resin from the lay-up surface.

17. The method of claim 1, wherein depositing the non-conductive layer on top of at least the portion of the first wiring harness comprises printing an insulating material.

18. The method of claim 1, wherein positioning the composite material on the lay-up surface comprises positioning the composite material by a machine.

19. The method of claim 1, wherein the composite material comprises resin including a polymer matrix surrounding the fibers.

20. The method of claim 1, further comprising installing the composite material piece into an aircraft.

* * * * *